S. WALTON.
CULTIVATOR.
No. 175,216. Patented March 21, 1876.
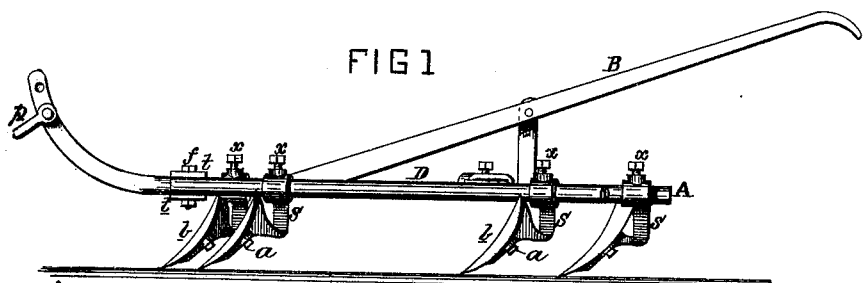
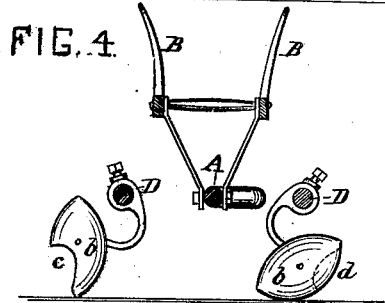
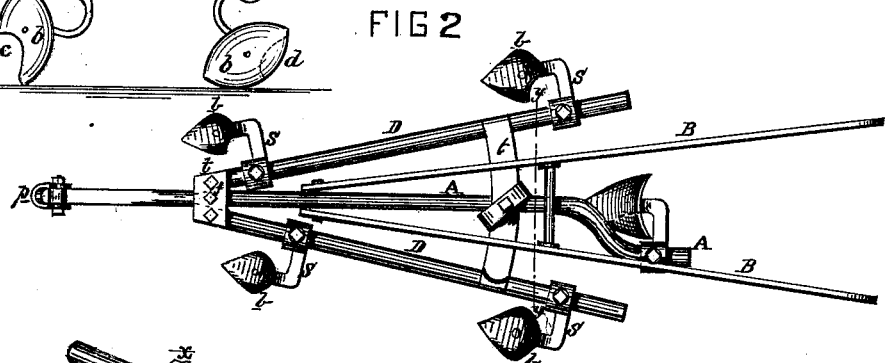
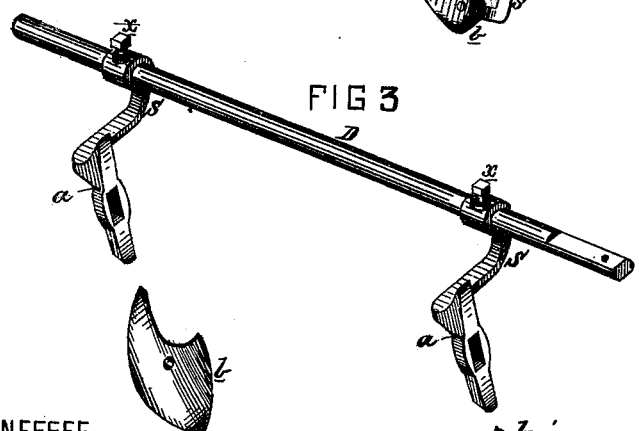
WITNESSES                    INVENTOR

UNITED STATES PATENT OFFICE.

SILAS WALTON, OF MOORESTOWN, NEW JERSEY.

IMPROVEMENT IN CULTIVATORS.

Specification forming part of Letters Patent No. 175,216, dated March 21, 1876; application filed February 5, 1876.

*To all whom it may concern:*

Be it known that I, SILAS WALTON, of Moorestown, in the county of Burlington and State of New Jersey, have invented a new and Improved Cultivator; and I do hereby declare that the following is a full, clear, and exact description of the same, reference being had to the accompanying drawing, forming a part of this specification, in which—

Figure 1 is a side elevation of said improvement; Fig. 2, a plan view thereof, showing the middle beam, with the rear standard and blade attached, and the horizontal arms or side beams with standards and blades attached; Fig. 3, a perspective view of one of the arms with the standards attached and the blades detached; Fig. 4, a cross-section of Fig. 2, through line $y\, y$.

My invention relates to an agricultural implement, so constructed as to pulverize the soil and pass clods and rubbish without clogging, having the blades so extended from the frame, and so placed that they lift and pass under the vines and lateral parts of plants, thus allowing the earth to be thrown under them, and so adjusted as to be used as a cultivator only, by pulverizing the soil and leaving it flat, or used as a cultivator and plow combined, by both pulverizing and ridging the soil at the same time, either to or from the rows of plants, as desired; and it consists in the combination, with the main beam and hinged arms of a cultivator, of certain standards, which are in shape and position curved downward and outward, terminating at the outward end with a vertically-inclined stem, made concave on its upper edge to carry reversible metallic hoes or blades, as herein shown.

The same parts are denoted by the same letters in all the figures.

A, in the drawing, represents the main or draft beam, the rear end of which is offset, to carry the rear blade in the line of the draft, and permit obstructions to pass over the top of the cultivator. In front of this offset on the main beam A are attached the handles B and clevis $p$. The arms D are round metallic rods, hinged on opposite sides of the forward part of beam A, are adjustable thereto by segment-plates $t$ lapping upon the main beam, and fastened thereto by clamp and screw, the implement being thus widened or narrowed, and kept in position, as required. The standards S are provided with eyes at their upper ends, and are affixed upon the main beam A, and upon the arms D. They are held in position thereon by pointed set-screws $x$, and are in shape or form curved downward and outward therefrom, and terminate at the outward ends in a transversely-inclined stem, $a$, as shown in Figs. 1 and 3. The blades $b$ are oblong concavo-convex steel plates, with the lower section uniformly convexed and narrowed to a point by regular curves. The upper sections of the blades are cut away and narrowed by irregular curves, as shown at $c$, Fig. 4, and are fastened on the lower front edge of standards S with the cut-away portion on the outside, so as to enable the cultivator to be run very close to the plant, for the purpose of cultivating the young plants without tearing the same, or throwing dirt thereupon.

If it is desired to bring a quantity of earth to the plants the standard S is turned upon its eye inwardly, and the blade turned also transversely to its seat $a$, as shown at $d$ on Fig. 4, in which position it operates as a mold-board. In this position the earth, that is previously pulverized or broken by the lower section of the blade in passing upward upon the upper section of it, is moved sidewise or ridged by the remaining half-section of the blade as it passes through it. The standards S being adjustable also in a rotary direction on the arms D, may be turned under or outward, and thus adjusted to throw more or less earth to the ridge or plant without clogging, and by being reversed will move the earth from or to the row or plant, as desired.

What I claim as new is—

1. The standard S, curved downwardly and outwardly, and terminating in a vertically-inclined stem or blade holder, arranged as described, for the purpose set forth.

2. The standard S, curved downwardly and outwardly, and terminating in an inclined blade-holder, in combination with the reversible blade $b$, cut away at $c$, as and for the purpose described.

3. The combination, with the main beam A, having an offset at its rear end, of the curved standard S, for the purpose of centering the blade in such a manner as to allow obstructions to pass over the top of the same, substantially as described.

The above specification of my invention signed by me this 2d day of February, A. D. 1876.

SILAS WALTON.

Witnesses:
SOLON C. KEMON,
CHAS. A. PETTIT.